Patented Sept. 15, 1953

2,652,416

UNITED STATES PATENT OFFICE 2,652,416

REACTION OF LACTONES WITH TRIALKYL PHOSPHITE

Harry W. Coover, Jr., and Joseph B. Dickey, Kingsport, Tenn., assignors to Eastman Kodak Company, Rochester, N. Y., a corporation of New Jersey No Drawing. Application January 2, 1952, Serial No. 264,674

8 Claims. (Cl. 260—461)

This invention relates to a novel reaction for the manufacture of phosphonates, and more particularly to a reaction in which a lactone and a trialkyl phosphite react to yield the corresponding dialkyl carboalkoxy alkanephosphonate.

This new reaction affords a practical method for the production of numerous dialkyl carboalkoxy alkanephosphonates, these compounds being useful as plasticizers, solvents, insecticides, and intermediates for the preparation of other organo-phosphorus compounds.

We have found that the phosphonates referred to above can be produced quite readily by the reaction of lactones with trialkyl phosphites. The reaction can be carried out by heating approximately equal molar quantities of the reactants in the absence or presence of an inert solvent. The reaction is preferably carried out at temperatures ranging from about 100° C. to 250° C., the reaction temperature depending upon the particular phosphite and lactone being reacted. The more reactive lactones such as β-propiolactone react readily at 100° C. to 150° C., while a less reactive lactone such as γ-valerolactone requires temperatures in the range of 200° C. to 250° C.

It is an object of our invention to provide an improved process for the production of dialkyl carboalkoxy alkanephosphonates. Another object of the invention is to provide dialkyl carboalkoxy alkanephosphonates by the reaction of trialkyl phosphites with lactones.

The following examples are illustrative of the invention, but it is to be understood that the scope of the invention extends beyond the reacting of the particular compounds set forth in these examples, as these examples are given purely in an illustrative sense:

Example 1

14.4 grams β-propiolactone and 27.6 grams triethyl phosphite were heated to reflux at about 150° C. for 16 hours, then fractionated under vacuum. 15.1 grams of diethyl β-carboethoxy ethanephosphonate B. P. 116–120/2 mm.

($\eta_D^{20}=1.4273$)

were obtained, along with a higher boiling product B. P. 150–210/2 mm. ($\eta_D^{20}=1.4418$).

The reaction of this example may be represented as follows:

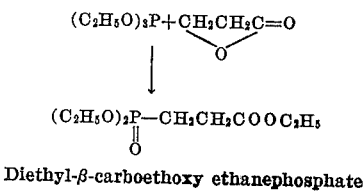

Diethyl-β-carboethoxy ethanephosphate

Example 2

20 grams of γ-valerolactone plus 33 grams of triethyl phosphite were placed in a Pyrex glass liner and heated in an autoclave to 210° C. for 18 hours. The reaction mixture was fractionated under vacuum, and after removal of starting material, a product was obtained boiling at 136–142 at 2 mm. pressure and containing 15.0 per cent phosphorus by analysis.

The reaction of this example may be represented as follows:

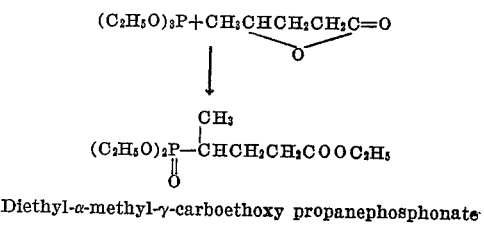

Diethyl-α-methyl-γ-carboethoxy propanephosphonate

Example 3

10.5 grams of β-angelica lactone was heated to reflux at about 160° C. with 16.5 grams of triethyl phosphite containing 0.3 gram concentrated sulphuric acid. After 48 hours the mixture was fractionated under vacuum, and 8 grams of material was obtained boiling from 100 to 170° C. at 2 mm. On refractionation a high boiling fraction was obtained, B. P. 145–165/2 mm., ($\eta_D^{20}=1.4790$). This fraction gave a strong positive permanganate test, and contained 4.3 per cent phosphorus by analysis.

The reaction of this example may be represented as follows:

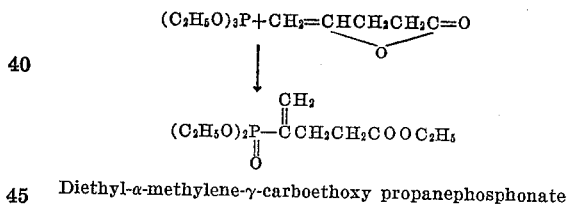

Diethyl-α-methylene-γ-carboethoxy propanephosphonate

While the above examples all make use of triethyl phosphite as one of the reactants, other tri-lower alkyl phosphites may be used in the general reaction which we have disclosed. Further, other lactones may be used in place of the three which have been set forth in the examples, as this new reaction is applicable generically to this type of compound.

If it desired to use an inert solvent in carrying out the reaction, the following are among the solvents which can be used: toluene, xylene, chlorobenzene, dibutyl ether and tetrachloroethane.

We claim:

1. A process for preparing dialkyl carboalkoxy alkane phosphonates comprising heating together a trialkyl phosphite and a lactone at about 100–250° C.

2. A process for preparing dialkyl carboalkoxy alkane phosphonates comprising heating together a trialkyl phosphite and a lactone selected from the group consisting of β-propiolactone, γ-valerolactone and β-angelica lactone at about 100–250° C.

3. A process according to claim 2 wherein approximately equal molar quantities of the reactants are heated together.

4. A process according to claim 2 wherein the trialkyl phosphite is triethyl phosphite.

5. A process according to claim 2 wherein the reactants are heated together for at least 16 hours, after which the reaction mixture is fractionated under vacuum.

6. A process for preparing diethyl-β-carboethoxy ethanephosphonate comprising heating together approximately equal molar quantities of β-propiolactone and triethyl phosphite at about 150° C.

7. A process for preparing diethyl-α-methyl-γ-carboethoxy propanephosphonate comprising heating together approximately equal molar quantities of γ-valerolactone and triethyl phosphite at about 210° C.

8. A process for preparing diethyl-α-methylene-γ-carboethoxy propanephosphonate comprising heating together approximately equal molar quantities of β-angelica lactone and triethyl phosphite at about 160° C.

HARRY W. COOVER, Jr.
JOSEPH B. DICKEY.

References Cited in the file of this patent

UNITED STATES PATENTS

| Number | Name | Date |
|---|---|---|
| 2,449,987 | Gresham | Sept. 28, 1948 |
| 2,593,213 | Stiles | Apr. 15, 1952 |